US012724990B2

(12) United States Patent
Caceres et al.

(10) Patent No.: US 12,724,990 B2
(45) Date of Patent: Sep. 1, 2026

(54) DUAL-ORIENTATION CARD READER

(71) Applicant: Cardtronics USA, Inc., Atlanta, GA (US)

(72) Inventors: Jant Albrent Kristdict Rafols Caceres, Cebu City (PH); Clemence Orl Ceriales Cadano, Cebu City (PH)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/006,324

(22) Filed: Dec. 31, 2024

(65) Prior Publication Data

US 2026/0187389 A1 Jul. 2, 2026

(51) Int. Cl.
*G06K 7/06* (2006.01)
*G06K 7/00* (2006.01)
*G06Q 20/34* (2012.01)

(52) U.S. Cl.
CPC ......... *G06K 7/0021* (2013.01); *G06Q 20/341* (2013.01)

(58) Field of Classification Search
CPC ...... G06K 17/00; G06K 7/04; G06K 7/10425; G06K 7/10861
USPC .......................................................... 235/441
See application file for complete search history.

(56) References Cited

U.S. PATENT DOCUMENTS 5,546,242 A 8/1996 Miller
5,668,365 A * 9/1997 Ito .......................... G06K 13/08 235/479
5,726,432 A 3/1998 Reichardt
6,581,830 B1 6/2003 Goss et al.
6,629,637 B1 * 10/2003 Von Der Lippe .... G06K 7/0069 235/451
6,655,590 B1 12/2003 Van et al.
9,262,651 B2 * 2/2016 Paulsen ............ G06K 19/07769
11,715,103 B2 * 8/2023 Vargas ................. G06Q 20/382 705/44
2005/0233645 A1 10/2005 Michel et al.
2013/0279110 A1 * 10/2013 Edwards .............. G07G 1/0018 361/679.44
2018/0330130 A1 * 11/2018 Loh ...................... G06K 7/0078
2024/0169333 A1 * 5/2024 Waddell ............... G06Q 20/341

FOREIGN PATENT DOCUMENTS

| | | |
|---|---|---|
| DE | 3916783 | 4/1990 |
| DE | 19708700 | 8/1998 |
| FR | 2801431 | 5/2001 |
| GB | 2298743 | 9/1996 |

* cited by examiner

*Primary Examiner* — Daniel St Cyr
(74) *Attorney, Agent, or Firm* — Schwegman Lundberg & Woessner, P.A.

(57) ABSTRACT

A dual probe card reader system accommodates Europay®, Mastercard®, and Visa® (EMV) cards in multiple orientations while retaining existing card reader footprints. The system includes a mechanism with two probes positioned to connect with EMV chips in different orientations when cards are facing up. The dual probe mechanism retains other existing card reader parts, enabling detection of EMV chips through either probe position. The system includes an updated probe printed circuit board and modified probe schematics to support both EMV positions. This technique provides enhanced compatibility with chip-based cards while minimizing replacement of existing card reader infrastructure through reuse of current device footprints.

20 Claims, 4 Drawing Sheets

DUAL-ORIENTATION CARD READER

BACKGROUND

Financial institutions are shifting away from magnetic stripe cards, which creates challenges for existing card reader infrastructure. With magnetic stripes being removed from cards, there is a need to accommodate different orientations for reading Europay®, Mastercard®, and Visa® (EMV) chips on cards using existing card reader modules. This presents a significant issue since there are multiple magnetic stripe card readers still deployed in the field that would require replacement or modification to handle cards without magnetic stripes. The potential replacement of existing card reader infrastructure to accommodate these changes could result in substantial waste of functional equipment.

Multiple magnetic stripe card readers are still deployed in the field, which would require significant replacement costs and potential waste if new card reader designs with different footprints were implemented. This creates a need for solutions that can reuse existing card reader infrastructure while accommodating chip-only cards.

DETAILED DESCRIPTION

Figure 1A:
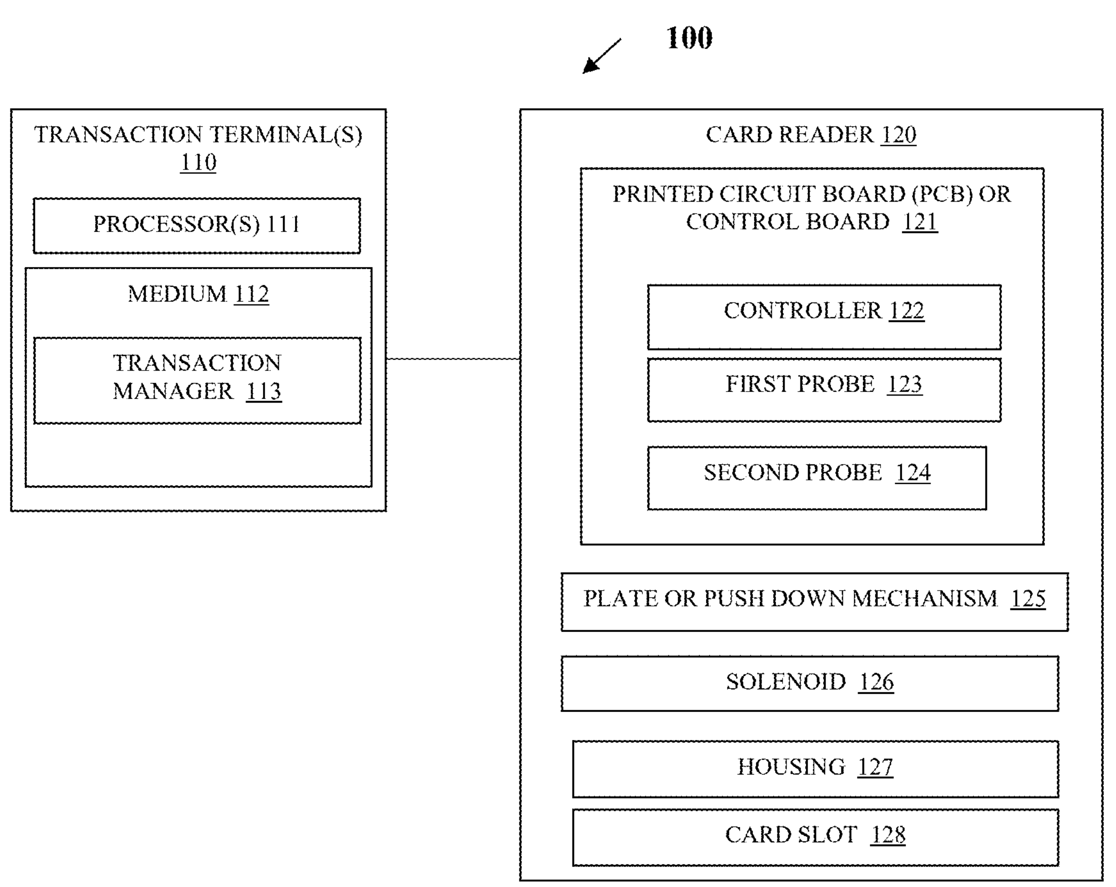
FIG. 1A is a diagram of a system for dual-orientation card reading, according to an example embodiment.

Financial institutions (Fis) are shifting away from magnetic stripe cards, creating a need to address card orientation challenges with Europay®, Mastercard®, and Visa® (EMV) chip reading. While existing card readers with EMV capability can read chip-only cards, users must insert their cards face-up with the chip oriented correctly for successful transactions. This creates a usability challenge as customers often insert their cards incorrectly, requiring multiple attempts to achieve proper chip reading The techniques herein provide a solution through a dual probe mechanism that enables EMV chip detection in multiple orientations while maintaining the existing card reader footprint. The embodiments herein utilize two probes positioned to connect with EMV chips, with one probe slightly lower and rotated 180 degrees relative to the other, based on IEEE EMV chip position standards. This configuration allows for chip detection whether the card is inserted face up with a leading edge adjacent to the chip first or face us with a trailing edge adjacent to the chip first.

One aspect of the embodiments herein includes the ability to modify existing card readers through an upgrade kit. The kit enables the installation of a second probe while retaining other original card reader components. This modification involves removing the magnetic reader components and installing the dual probe mechanism, which includes updating the probe printed circuit board (PCB) to accommodate both EMV positions. The modified probe schematics support both EMV positions through reoriented pins of the second probe, ensuring proper chip reading in either orientation.

The techniques herein maintain the existing card reader footprint while eliminating the need for complete device replacement. By reusing most of the existing design and components, the techniques significantly reduce potential equipment waste while providing enhanced functionality for EMV-only cards. The dual probe system operates with the same card insertion and locking mechanism as traditional readers, requiring no additional sensors for orientation detection.

Further, the dual probe system ensures that a customer's card is read even when the customer does not insert the card with the leading edge of the card that is adjacent to the chip first. This improves customer satisfaction and also saves transaction time since the customer's card is read even when the customer inserts the card with the card chip being adjacent to the trailing edge of the inserted card. The customer does not waste time removing the card and reinserting the card during a transaction to conduct the transaction at a transaction terminal because the card is read from multiple card insertion orientations.

A "transaction terminal" can include an automated teller machine (ATM), a self-service terminal (SST), a point-of-sale (POS) terminal, or a kiosk. The terminal includes a variety of peripheral devices, one of which is a card reader that reads card data from a card during transactions at the terminal.

FIG. 1A is a diagram of a system 100 for dual-orientation card reading, according to an example embodiment. Notably, the components are shown schematically in simplified form, with only those components relevant to understanding of the embodiments being illustrated.

Furthermore, the various components (that are identified in system 100) are illustrated and the arrangement of the components are presented for purposes of illustration only. Notably, other arrangements with more or less components are possible without departing from the teachings of dual-orientation card reading, presented herein and below.

System 100 includes a transaction terminal 110 and a card reader 120. Terminal 110 includes at least one processor 111 and a non-transitory computer-readable storage medium (hereinafter just "medium") 112, which includes instructions for a transaction manager 113. The instructions when provided to and executed by processor 111 cause processor 111 to perform the processing or operations discussed herein and below with respect to 113.

The card reader 120 includes a PCB 121, a plate or push down mechanism 125, a solenoid 126, a housing 127, and a card slot 128. The PCB 121 includes a controller 122, a first card reading probe 123, and a second reading probe 124. The controller 122 includes a microprocessor or microcontroller. In an embodiment, first probe 123 and second probe 124 are positioned according to Institute of Electrical and Electronics Engineers (IEEE) EMV chip position standards to ensure accurate interfacing with the 8 probe positions on EMV chips. The precise positioning and measurements between the probes ensures proper chip detection in both orientations.

Notably, first probe 123 and the second probe include contact pins or pads that interface with a chip embedded in a card in designated pin locations of the chip necessary for reading card data from the card. There are typically 8 pins on the chip of the card, corresponding both the first probe 123 and second probe include 8 pins. The first probe 123 and the second probe 124 are identical although oriented differently on the PCB 121. For example, the first pin of the first probe 123 is oriented on the PCB 121 such that it is located in a bottom rightmost corner of the pad whereas the first pin of the second probe 124 is located in a top leftmost corner of the corresponding pad.

The arrangement of the first probe 123 and the second probe 124 on the PCB 121 permits a chip card to be interfaced to and read by the controller 122 using the first probe 123 when the card is inserted into the card slot 128 with the leading edge of the inserted card having the chip of the card is adjacent to the leading edge. The arrangement of the first probe 123 and the second probe 124 on the PCB 121 also permits a chip card to be interfaced and read by the controller using the second probe 124 when a trailing edge of the inserted card having the chip of the card is adjacent to the trailing edge.

Conventional chip card readers are only capable of reading an inserted card's chip when the card is inserted into the card slot with the chip adjacent to the leading edge of the card being inserted; conventional card readers are only capable of reading the chips of cards in a single card insertion orientation. Conversely, the physical layout and dual probes 123 and 124 of PCB 121 permits chips of cards to be read in two orientations. Additionally, the PCB 121 includes updated probe schematics to properly read chips in both orientations, with reoriented pins on the second probe 124 to ensure proper chip reading.

Notably, PCB 121 is shown in simplified form with just the components necessary to understanding the embodiments presented herein illustrated. For example, PCB 121 also includes memory, power supply components, communication interfaces, cryptographic and security modules, optional light emitting diodes (LEDs), and/or optional audible modules.

The plate or push down mechanism 125 holds the PCB 121 and is lowered onto the chip of an inserted card and raised off the chip of the inserted card via the solenoid 126. The housing 127 surrounds and encases the internal components of the card reader 120 and includes the card slot 129 through which a card is inserted and removed during a transaction from the card reader 120. Notably, the card reader 120 also includes a card locking mechanism (not illustrated in FIG. 1A) that locks and holds the card inserted via the card slot 128 when the plate or push down mechanism 125 lowers the PCB 121 along with the first probe 123 and the second probe 124 on to the chip of the card during a transaction in which card data is being read from the chip of the card. When card is unlocked when the plate or push down mechanism 125 is raised off the card so that the card is retrieval from the card slot 128 by a consumer.

Figure 1B:
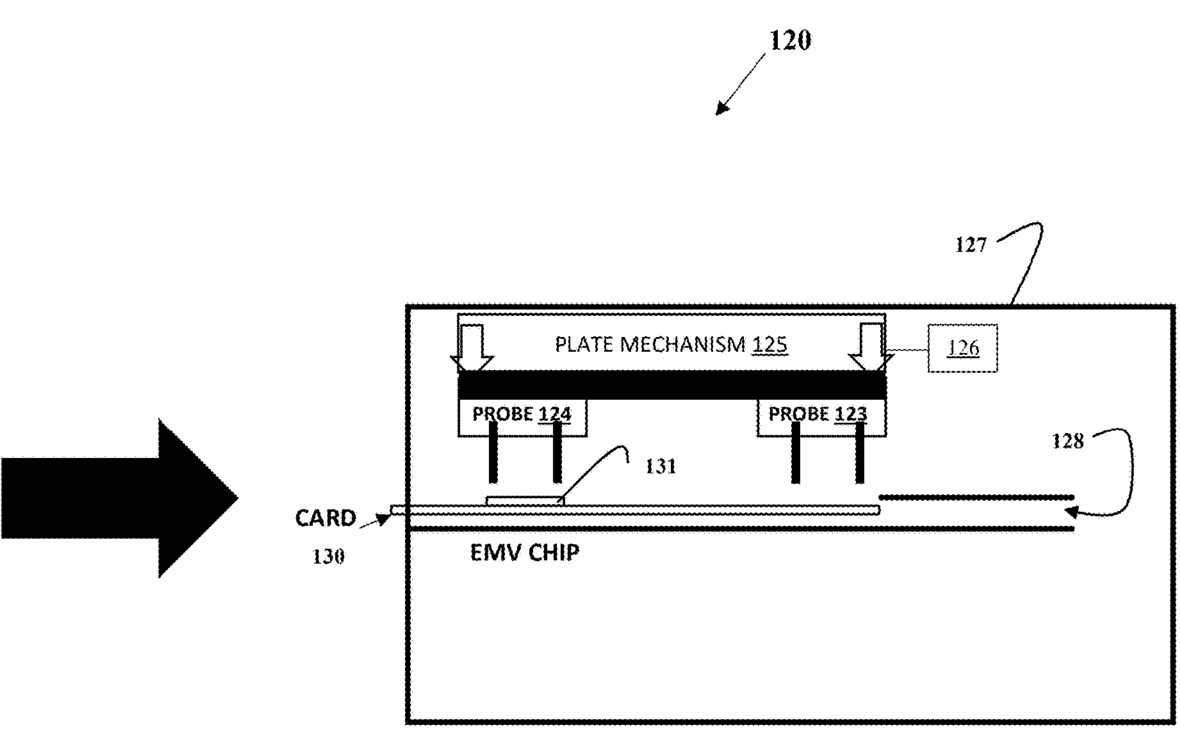
FIG. 1B is a diagram of a card reader reading a chip card, according to an example embodiment.

FIG. 1B is a diagram of the card reader 120 within a fully inserted card 130 placed in the card slot 128 during reading a of card data from a chip 131 of the card 130, according to an example embodiment. The orientation of the chip 131 inserted into the card slot 128 is a non-conventional orientation and one in which conventional card readers are unable to process. The orientation shown illustrates a trailing edge of the inserted card 130 is adjacent to the card's embedded chip 131. Card reader 120 is capable of reading this non-conventional orientation via second probe 124. Card reader is also capable of reading the card 130 when the card 130 is inserted into the slot 128 with the leading edge of the inserted card 130 being adjacent to chip 131 via first probe 123.

Once the card 130 is inserted via card slot 128, plate or push down mechanism 125, powered and controlled via solenoid 126, is lowered down onto the card 130 such that the pins of the pads for second probe 124 interface corresponding pins of the chip 131 embedded on the card 130. This permits controller 122 to read the card data off the chip 131 and make the card data available to transaction manager 113 of terminal 110 during a transaction of a consumer at the terminal 110. When the card data is obtained off the chip 131 for the transaction, solenoid 126 raises the plate or push down mechanism 125 off the card 130 and the card is retrieval from card slot 128 by the consumer.

Figure 1C:
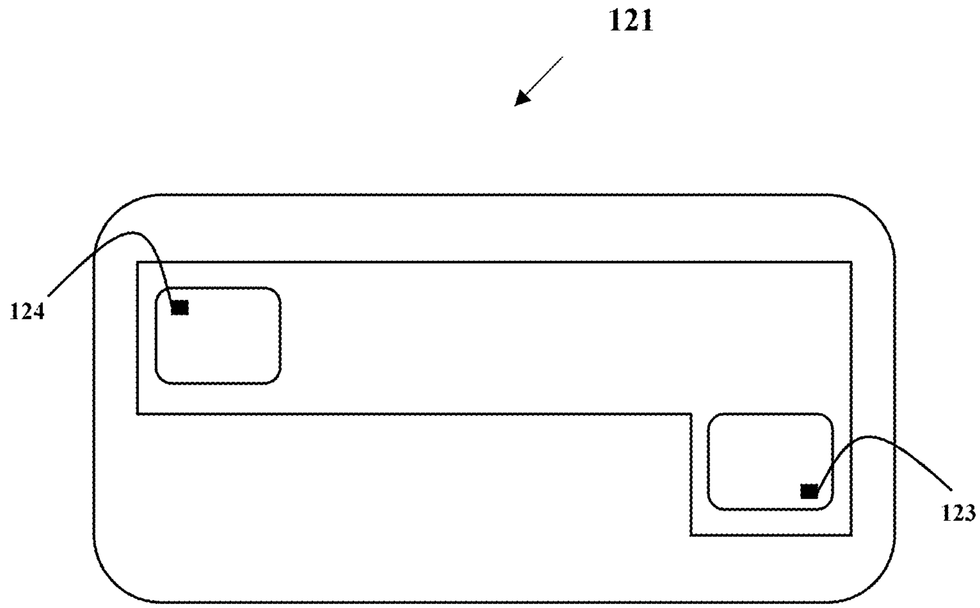
FIG. 1C is a diagram a printed circuit board (PCB) with dual chip reading probes, according to an example embodiment.

FIG. 1C is a diagram a PCB 121 with dual chip reading probes 123 and 124, according to an example embodiment. The first probe 123 is located on the PCB 121 in a first orientation such that a first pin of its pad is located in a bottom rightmost corner of its pad. The second probe 124 is located on the PCB 121 in a second orientation that is flipped 180 degrees from the first orientation of the first probe 123. The first pin of the pad for the second probe 124 is located in a top leftmost corner of its pad.

The first orientation permits the controller 122, via the first probe 123, to read card data when a card is inserted into slot 128 with the card's leading edge being adjacent to the chip of the card. The second orientation is flipped 180 degrees from the first orientation. The second orientation permits the controller, via the second probe 124, to read card data when a card is inserted into slot 128 with the card's trailing edge being adjacent to the chip of the card.

Figure 2:
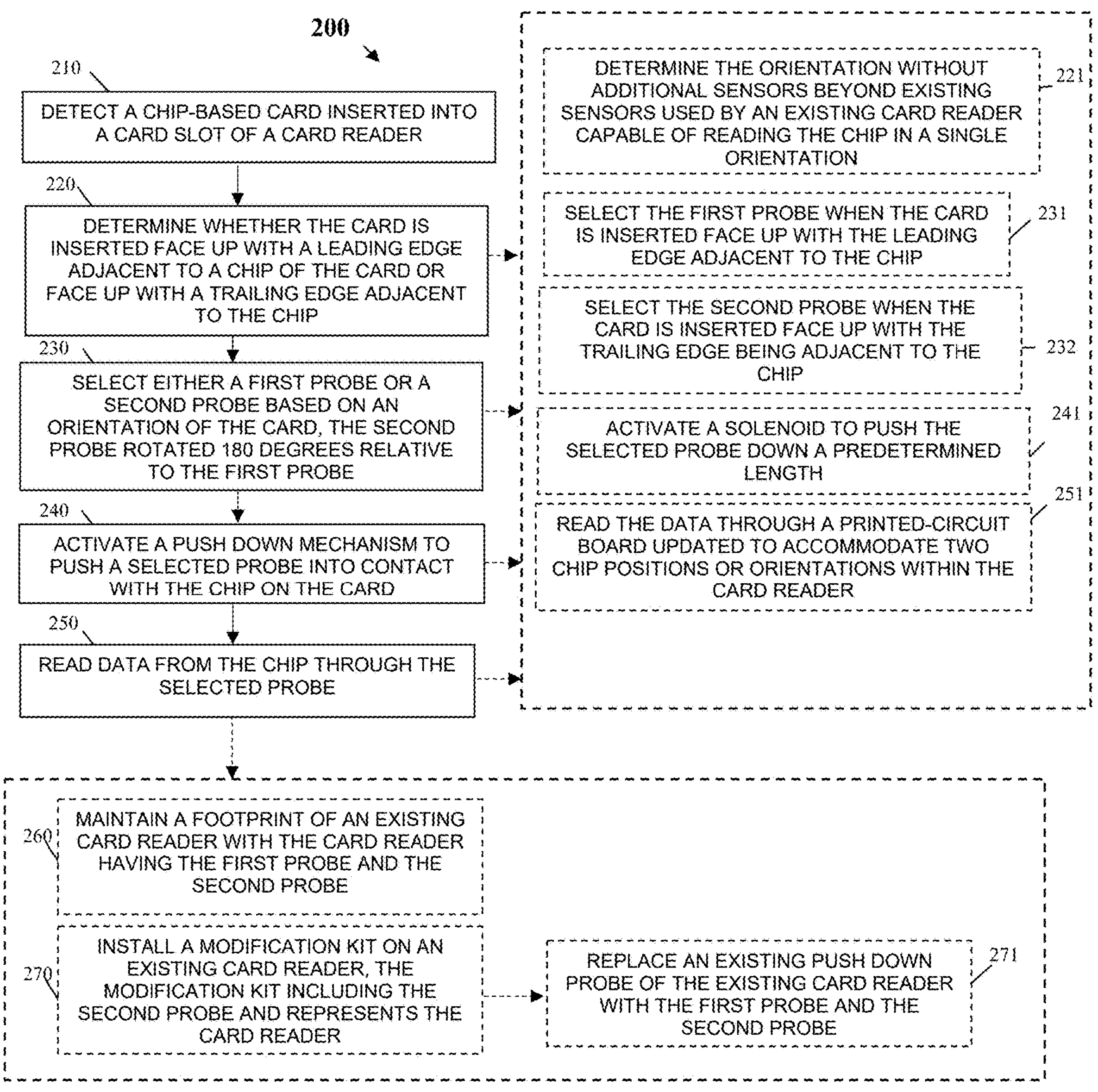
FIG. 2 is a flow diagram of a method for dual-orientation card reading, according to an example embodiment.

The above-referenced embodiments and other embodiments are now discussed with reference to FIG. 2. FIG. 2 is a flow diagram of a method 200 for dual-orientation card reading, according to an example embodiment. The software module(s) that implements the method 200 is referred to as a "dual orientation card reader." The dual orientation card reader is implemented as executable instructions or firmware programmed and residing within memory and/or a non-transitory computer-readable (processor-readable) storage medium and executed by one or more processors or microcontrollers of a card reader. The processor(s) or microcontroller(s) of the card reader that executes the dual orientation card reader are specifically configured and programmed to process the dual orientation card reader. The dual orientation card reader may have access to one or more network connections during its processing. The network connections can be wired, wireless, or a combination of wired and wireless.

In an embodiment, the card reader that executes the dual orientation card reader is card reader 120. In an embodiment, dual orientation card reader controls electromechanical components 123-126 of card reader 120. In an embodiment, the dual orientation card reader represents the controller 122 of card reader 120.

At 210, dual orientation card reader detects a chip-based card inserted into a card slot 128 of a card reader 120. This occurs when a consumer inserts the card into the card slot 128 during a transaction being performed by the consumer at a terminal 110.

At 220, the dual orientation card reader determines whether the card is inserted face up with a leading edge of the card being adjacent to a chip of the card or face up with a trailing edge of the card being adjacent to the chip of the card. In an embodiment, at 221, the dual orientation card reader determines that the orientation without any additional sensors beyond existing sensors used by an existing card reader, which is capable of reading the chip in a single orientation.

At 230, the dual orientation card reader selects either a first probe 123 or a second probe 124 based on an orientation of the card. The second probe 124 is rotated 180 degrees relative to the first probe 123. In an embodiment, at 231, the dual orientation card reader selects the first probe 123 when the card is inserted face up with the leading of the card being adjacent to the card's chip. In an embodiment, at 232, the dual orientation card reader selects the second probe 124 when the card is inserted face up with the trailing edge being adjacent to the card's chip.

At 240, the dual orientation card reader activates a plate or push down mechanism 125 to push a selected probe and its corresponding pins on its pad into contact with corresponding pins on the chip of the card. In an embodiment, at 241, the dual orientation card reader activates a solenoid 126 to push the selected probe down a predetermined length necessary to interface the corresponding pins on the chip of the card.

At 250, the dual orientation card reader reads data from the chip of the card through the selected probe. In an embodiment, at 251, the dual orientation card reader reads the data through a PCB 121 updated or enhanced to accommodate two card chip positions or orientations within a card slot 128 of the card reader 120.

In an embodiment, at 260, the dual orientation card reader maintains a footprint of an existing card reader with the card reader 120 having the first probe 123 and the second probe 124. That is, the dimensions and sizes of the card reader, which includes the first probe 123 and the second probe 124, is the same as or unchanged from the dimensions and sizes of an existing card reader that includes only a single probe for reading card data when a card is inserted in a defined and single orientation. In an embodiment, the modification kit enables updating of the card reader while retaining the existing Magnetic Card Reader/Writer (MCRW) footprint. The kit allows for removal of magnetic reader components while preserving other card reader parts during installation of the dual probe mechanism.

In an embodiment, at 270, the dual orientation card reader installs a modification lit on an existing card reader. The modification kit includes the second probe 124 on a PCB 121 and with the second probe installed the existing card reader is enhanced as the card reader 120 capable of reading card data from a chip-based card when the card is inserted into the card slot 128 in a first orientation and/or a second orientation. In an embodiment, of 270 and at 271, the dual orientation card reader replaces an existing push down probe of the existing card reader with the first probe 123 and the second probe 124.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A card reader comprising:

a housing having a card slot configured to receive a chip-based card;

a first probe positioned within the housing to connect with a chip when the chip-based card is inserted face up with a leading edge of the chip-based card being adjacent to the chip;

a second probe positioned within the housing and rotated 180 degrees relative to the first probe to connect with the chip when the chip-based card is inserted face up with a trailing edge of the chip-based card being adjacent to the chip;

a push mechanism configured to push the first probe or second probe into contact with the chip;

a printed circuit board including a controller, the first probe, and the second probe, wherein the first probe includes a first pad with a first pin located in a bottom rightmost corner of the first pad, and the second probe includes a second pad with a first pin located in a top leftmost corner of the second pad; and a control board configured to read data from the chip through either the first probe or second probe.

2. The card reader of claim 1, wherein the second probe is positioned slightly lower than the first probe within the housing.

3. The card reader of claim 1, wherein the push mechanism comprises a solenoid configured to push the first probe and the second probe down a predetermined length.

4. The card reader of claim 1, wherein the control board comprises a printed circuit board updated to accommodate two chip positions.

5. The card reader of claim 1, wherein the control board is configured to read the chip without requiring any sensor to detect an orientation of the chip-based card.

6. The card reader of claim 1, wherein the housing maintains a footprint of an existing dual magnetic card and chip reader.

7. The card reader of claim 1, wherein the card reader comprises a modification kit installed on an existing card reader, the modification kit including the second probe.

8. The card reader of claim 7, wherein the modification kit replaces an existing push down probe of the existing card reader with the first probe and the second probe.

9. The card reader of claim 1, wherein the first probe and second probe are positioned based on standardized chip position specifications.

10. A method comprising:

detecting a chip-based card inserted into a card slot of a card reader;

determining whether the chip-based card is inserted face up with a leading edge of the chip-based card being adjacent to a chip of the chip-based card or face up with a trailing edge of the chip-based card being adjacent to the chip;

selecting either a first probe or a second probe based on an insertion orientation of the chip-based card, wherein the second probe is rotated 180 degrees relative to the first probe, wherein the first probe and the second probe are positioned on a printed circuit board with the first probe having a first pad with a first pin located in a bottom rightmost corner of the first pad, and the second probe having a second pad with a first pin located in a top leftmost corner of the second pad;

activating a push mechanism to push a selected probe into contact with a chip on the chip-based card; and reading data from the chip through the selected probe.

11. The method of claim 10, wherein determining comprises determining the insertion orientation without additional sensors beyond existing sensors used by an existing card reader, wherein the existing card reader is just capable of reading the chip in just a single orientation.

12. The method of claim 10, wherein selecting comprises selecting the first probe when the chip-based card is inserted face up with the leading edge adjacent to the chip.

13. The method of claim 10, wherein selecting comprises selecting the second probe when the chip-based card is inserted face up with the trailing edge adjacent to the chip.

14. The method of claim 10, wherein activating comprises activating a solenoid to push the selected probe down a predetermined length.

15. The method of claim 10, wherein reading data comprises reading data through a printed circuit board updated to accommodate two chip positions or orientations within the card reader.

16. The method of claim 10, further comprising maintaining a footprint of an existing dual magnetic card and chip reader with the card reader having the first probe and the second probe.

17. The method of claim 10, further comprising installing a modification kit on an existing card reader, the modification kit including the second probe.

18. The method of claim 17, further comprising replacing an existing push down probe of the existing card reader with the first probe and the second probe.

19. A system, comprising:

a card reader housing configured to receive a chip-based card; and a dual probe mechanism within the card reader housing comprising:

a first probe positioned to connect with a chip when the chip-based card is inserted face up with a leading edge of the chip-based card being adjacent to the chip;

a second probe rotated 180 degrees relative to the first probe and positioned to connect with the chip when the chip-based card is inserted face up with a trailing edge of the chip-based card being adjacent to the chip;

a push mechanism configured to selectively engage either the first probe or second probe with the chip;

a printed circuit board including the first probe and the second probe, wherein the first probe includes a first pad with a first pin located in a bottom rightmost corner of the first pad, and the second probe includes a second pad with a first pin located in a top leftmost corner of the second pad; and a control board configured to read data from the chip through an engaged probe.

20. The system of claim 19, wherein the dual probe mechanism comprises a modification kit configured to replace an existing push down probe of an existing card reader.

* * * * *